US00RE36942E

United States Patent [19]

Shepley, Jr. et al.

[11] E Patent Number: Re. 36,942

[45] Reissued Date of Patent: Nov. 7, 2000

[54] BOW HANDLE WITH OFFSET IN WINDOW

[75] Inventors: Paul E. Shepley, Jr.; Richard Johnston; Allan F. Smith, all of Tucson, Ariz.

[73] Assignee: Precision Shooting Equipment, Inc., Tucson, Ariz.

[21] Appl. No.: 08/286,791

[22] Filed: Aug. 5, 1994

Related U.S. Patent Documents

Reissue of:

[64] Patent No.: 5,005,554
Issued: Apr. 9, 1991
Appl. No.: 07/197,294
Filed: May 23, 1988

U.S. Applications:

[63] Continuation of application No. 08/076,421, Jun. 14, 1993, abandoned, which is a continuation of application No. 07/920,080, Oct. 17, 1986, abandoned.

[51] Int. Cl.[7] ..... F41B 5/10

[52] U.S. Cl. ..... 124/24.1; 124/25.6; 124/44.5; 124/88

[58] Field of Search ..... 124/88, 87, 86, 124/24.1, 23.1, 25, 25.6, 411, 44.5

[56] References Cited

U.S. PATENT DOCUMENTS

| | | | |
|---|---|---|---|
| 213,083 | 3/1879 | Wright et al. | 124/24.1 |
| 1,847,593 | 3/1932 | Cameron | 124/24.1 |
| 1,926,845 | 9/1933 | Folberth | 124/24.1 |
| 2,186,386 | 1/1940 | Lowell | 124/24.1 |
| 2,344,799 | 3/1944 | Brown | 124/88 |
| 2,542,501 | 2/1951 | Fredrickson | 124/24.1 |
| 2,960,084 | 11/1960 | Kramer | 124/24.1 |
| 3,135,255 | 6/1964 | Hoyt | 124/24.1 |
| 3,486,495 | 12/1969 | Allen | 124/25.6 |
| 3,502,063 | 3/1970 | Bear | 124/23.1 |
| 3,517,658 | 6/1970 | Shurts | 124/23.1 |
| 3,566,853 | 3/1971 | Larm | 124/24.1 |

(List continued on next page.)

OTHER PUBLICATIONS

Martin Archery Catalog, unnumbered pages showing the MT–6 Cougar II, 1976.
Archery, Apr. 1794, "How to Make Your Own Overdraw," pp. 12 and 13.
Archery, Dec. 1794, p. 7.
Archery, Dec. 1971, pp. 12, 13 and 38.
Archery, May 1971, p. 11.
Archery, Dec. 1970, pp. 30 and 44.
Archery, Mar. 1970, p. 19.
Archery, Feb. 1955, p. 46.
Archery, Apr. 1954, p. 48.
Archery, Jul. 1959, p. 45.
Archery, Dec. 1953, p. 31.
Archery, Jul. 1953, p. 45.
Archery World, Sep. 1973, p. 58.
Archery World, Apr. 1970.
Petersen's Bow Hunting, May 1990, pp. 38–43.

*Primary Examiner*—Anthony Knight
*Attorney, Agent, or Firm*—Cahill, Sutton & Thomas P.L.C.

[57] ABSTRACT

[An archery] *A* bow handle [or riser, in which the riser] is [cut out sufficiently] *shaped* to permit a broad head arrow[head] to pass rearwardly of the hand grip [section,] and, upon release of the arrow, to avoid interference with the [riser] *handle* by both the broad head point [as well as] *and* the vanes [at the rear portion] of the arrow [is disclosed]. [Provision is made beneath the riser sight window] *An* offset [to mount an arrow rest, which may interlock into a cutout, and which extends] *in the window of the handle is displaced* somewhat further [offset in order to position the arrow on] *than the window from* the center line of the bow [so that it will behave as an arrow fired with a prior-art type bow handle riser, but accommodating] *to accommodate* a shorter arrow with a board head[,] and [avoiding] *avoid* the frictional and deflecting contact of the vanes with the [riser] *handle*. [Vane deflection may be a problem with any length arrow and any type of arrow head used on a bow without the sight window offset feature as set forth in the present invention.]

16 Claims, 3 Drawing Sheets

U.S. PATENT DOCUMENTS

| | | | |
|---|---|---|---|
| 3,623,468 | 11/1971 | Crest | 124/24.1 |
| 3,698,375 | 10/1972 | Brougham | 124/24.1 |
| 3,834,368 | 9/1974 | Geiger | 124/88 |
| 3,890,951 | 6/1975 | Jennings et al. | 124/44.5 |
| 3,969,026 | 7/1976 | Johnson | 401/37 |
| 4,005,696 | 2/1977 | Jennings | 124/25.6 |
| 4,060,066 | 11/1977 | Kudlacek | 124/25.6 |
| 4,061,124 | 12/1977 | Groner | 124/25.6 |
| 4,078,538 | 3/1978 | Shepley | 124/90 X |
| 4,241,715 | 12/1980 | Jennings | 124/25.6 |
| 4,287,868 | 9/1981 | Schiff | 124/24.1 |
| 4,300,521 | 11/1981 | Schmitt | 124/25.6 |
| 4,305,208 | 12/1981 | Larson | 33/265 |
| 4,309,827 | 1/1982 | Larson | 33/265 |
| 4,350,138 | 9/1982 | Caldwell | 124/86 |
| 4,421,092 | 12/1983 | Christian | 124/44.5 |
| 4,440,142 | 4/1984 | Simonds | 124/25.6 |
| 4,449,303 | 5/1984 | Larson | 124/87 X |
| 4,461,267 | 7/1984 | Simonds et al. | 124/88 X |
| 4,478,962 | 10/1984 | Woodson | 523/144 |
| 4,515,142 | 5/1985 | Nurney | 124/25.6 |
| 4,521,972 | 6/1985 | Larson | 33/265 |
| 4,561,413 | 12/1985 | Jennings | 124/25.6 |
| 4,562,824 | 1/1986 | Jennings | 124/25.6 |
| 4,621,606 | 11/1986 | Toth | 124/24.1 |
| 4,640,889 | 2/1987 | Komorita et al. | 430/505 |
| 4,649,889 | 3/1987 | Johnston | 124/25.6 X |
| 4,662,346 | 5/1987 | Laffin | 124/24.1 |
| 4,685,438 | 8/1987 | Larson | 124/86 X |
| 4,704,800 | 11/1987 | Stinson | 124/88 |
| 4,748,962 | 6/1988 | Larson | 124/25.6 |
| 4,759,337 | 7/1988 | Suski | 124/24.1 |
| 4,774,927 | 10/1988 | Larson | 124/25.6 |
| 4,781,167 | 11/1988 | Martin | 124/25.6 |
| 4,879,988 | 11/1989 | Larson | 124/44.1 |
| 4,884,347 | 12/1989 | Larson | 33/265 |
| 4,899,716 | 2/1990 | Martin et al. | 124/44.5 |
| 4,909,231 | 3/1990 | Larson | 124/25.6 X |
| 4,919,108 | 4/1990 | Larson | 124/25.6 X |
| 4,947,823 | 8/1990 | Larson | 124/44.1 |
| 4,967,721 | 11/1990 | Larson | 124/25.6 |
| 5,005,554 | 4/1991 | Shepley et al. | 124/88 |

BOW HANDLE WITH OFFSET IN WINDOW

Matter enclosed in heavy brackets [ ] appears in the original patent but forms no part of this reissue specification; matter printed in italics indicates the additions made by reissue.

CROSS-REFERENCE TO RELATED APPLICATIONS

[The present application] *This application is a continuation of application Ser. No. 08/076,421, filed Jun. 14, 1993, now abandoned, which is a Reissue application of Ser. No. 07/197,294, filed May 23, 1998, now U.S. Pat. No. 5,005, 554, which* is a continuation of application Ser. No. 07/920, 080, filed Oct. 17, 1986, now abandoned, by the same inventors herein and entitled Bow Handle Riser.

BACKGROUND OF THE INVENTION

1. Field of the Invention

The present invention relates to archery bows[,] and, and more particularly, [that type of] *to a* bow having two limbs mounted on a central handle or riser [portion] with the handle [portion] containing a grip[,] and an arrow rest. More specifically the present invention is directed to a specific construction of the [riser along with the] *handle and* accessory mounts.

2. Summary of the Prior-Art

Archery bows have existed for centuries. More recently the compound archery bow has become a favorite of hunters and target shooters. Such a bow is exemplified in Allen U.S. Pat. No. 3,486,495.

A long-standing problem with archery bows [evolves] *revolves* around the support of the arrow when the bow is drawn as well as when the [bow] *arrow* is released. A myriad of arrow rests have been developed. Most of these, however, do not position the arrow far enough away from the bow handle [riser] to avoid interference with the vanes as the rear portion of the arrow passes the [riser] *handle*. This is due to the design of the [riser] *handle*.

In addition, in order to impart as much kinetic energy and speed to the arrow as possible, [they are] *an arrow is* normally quite long and drawn fully before release. [With hunting] *Hunting* arrows[, particularly utilizing] *utilize* a broad head point [whether it has] *having* two blades, three blades, or four blades, [the same] *which* may interfere with the handle [riser,] and, accordingly, *limit* the draw of the arrow [is limited]. This requires a longer arrow when a broadhead is used.

In many situations, however, a shorter lighter arrow is desirable. If the same amount of [force] *energy* can be [spent on] *transferred to* a shorter lighter arrow, [and] it will [carry the same amount of kinetic energy, then depending upon the increase in] *have a greater* velocity[, the] *and a flatter* trajectory [of the shorter lighter arrow will be flatter] than that of [the] *a* longer heavier arrow. [Particularly when] *When* hunting, [and the] conditions are not *as* ideal as [is] on a target range[,] *and* the shorter lighter arrow with the flatter trajectory gives the archer greater assurance of striking the target.

SUMMARY OF THE INVENTION

The present invention is directed to [an archery bow] *a* handle or riser[,] *for an archery bow* in which the [riser is cut out sufficiently] *handle has an offset in the sight window* to permit a broad head arrowhead to pass rearwardly of the hand grip section[,] and, upon release of the arrow, to avoid interference with the [riser] *handle* by both the broad head point as well as the vanes at the rear [portion] of the arrow. Provision is made [beneath] *in* the [riser sight window] offset [to mount] *for mounting* an arrow rest, which may interlock [into] *with* a [cutout] *recess*[,] and which [extends] *is displaced* somewhat further [offset] *from the centerline of the bow* in order to position [the] *an* arrow on the centerline of the bow so that it will behave as an arrow fired with a prior-art type *of* bow handle [riser,] but accommodating a shorter arrow with a broad head[,] and avoiding the frictional and deflecting contact of the vanes with the riser. Vane deflection may be a problem with any length arrow and any type of arrow head used on a bow without the [sight window] offset feature as set forth in the present invention.

It, therefore, is a principal object of the present invention to provide a bow handle [or riser] with [a cutout] *an offset* so that overdraw with any broad head point can be achieved[,] and deflecting or frictional engagement of the vanes *is avoided* when the arrow is released [is avoided]. Bow handles may also be designed with the offset clearance the full length of the window. This induces a problem in that conventional sights may not work in such an environment. The sight pins in that instance need to be made longer.

Another and important related object of the present invention is to provide a bow handle [or riser] with [a sight window] *an* offset[, but still] *and* preserve the features of a mounting bracket above the offset to permit securing such accessories as a bow sight, bow quiver, and arrow rest to the bow handle.

Yet another object of the present invention is to achieve the advantages of a bow handle [or riser with a cutout] *having an offset* such as set forth above in a construction which is inherently no more expensive than the prior-art bow [handle risers] *handles*.

BRIEF DESCRIPTION OF THE DRAWINGS

Further objects and advantages of the present invention will become apparent as the following description proceeds, taken in conjunction with the accompanying drawings, in which.

DESCRIPTION OF A PREFERRED EMBODIMENT

Figure 1:
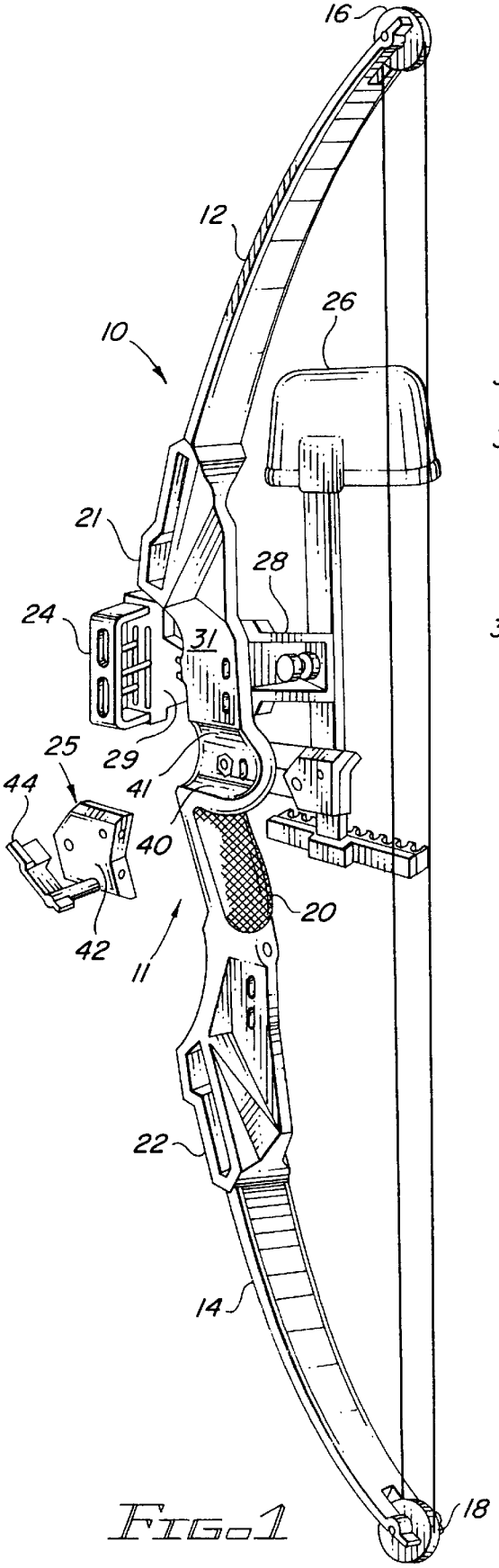
FIG. 1 is a perspective view of a [typical] bow [illustrating the utilization of the riser exemplary of] *constructed in accordance with* the present invention and [showing] *having* optional accessories mounted in [interlocking cutout to] *recesses in* the bow.

[Turning now to] *In* FIG. 1, [it will be seen that an] archery bow 10 [is illustrated which] has [a] handle [riser] 11 [to which is] secured [an] *to* upper limb 12[,] and lower limb 14. The [remote portions] *free ends* of the [limb] *limbs* are joined by [a] bow string 15. In the present instance, [the] bow string 15 is shown [with its relationship] *connected* to [the] upper wheel 16 and [the] lower wheel 18. This construction is what is often referred to in the archery trade as a compound bow. The present invention, however, can be utilized with a non-compound bow since it is directed primarily to the handle [or riser section,] and, more specifically, *to* the sight window [portion] of [the] *a* handle [section].

[The handle or riser] *Handle* 11 is provided at a lower portion with [a] grip 20 which is normally slipped over the casting of [the] handle 11[,] and is [that portion of the bow which is] grasped by the archer's hand. [The handle or riser ] *Handle* 11 has [an] upper limb mount 21[,] and [a] lower limb mount 22. [The bow] *Bow* limbs 12, 14 are secured to those mounts by various techniques[,] but normally they are releasably secured for taking down the bow, [and] adjusting the draw weight, or replacing the limbs. In shooting fashion, however, they are the equivalent to being permanently secured to the handle riser 11.

Accessories are common, particularly on hunting bows. As shown in FIG. 1, [there is a] bow sight 24[, an] *and* arrow *quiver 26 are attached* to [the] handle [or riser] 11 by means of [the bow quiver] bracket 28. [The sight] *Sight* is secured to [the] bow handle 11 by means of [the sight] bracket 29.

Central to [the archery] handle 11 is [the] sight window 30. [The handle] *Handle* 11 has *accessory mount area 31* at its upper portion [an accessory mount area 31]. The *window of* handle 11 terminates at its lower portion in [an overdraw offset] base 32 which is immediately above [the] grip 20. That portion of [the] handle 11 which is on the arrow side of [the sight] window 30 [of the handle or riser 11] is known as [the] sight window face 34. [Opposite the sight window face] *Face* 34 is [a] *displaced from* center line 35 which lies in the plane of [the] bow string 15.

Figure 2:
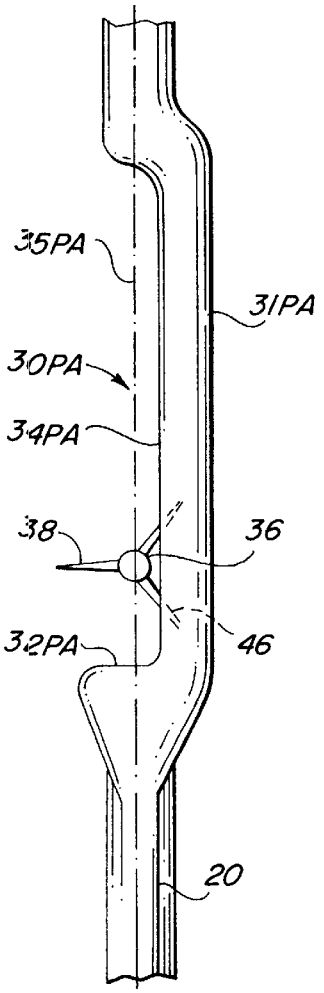
FIG. 2 (PRIOR ART)
FIG. 2 is a partially diagrammatic view of a prior-art bow [riser] *handle* illustrating the interference [relationship] between the vanes on an arrow and the [riser] face *of the sight window in the handle*[,] and comparably illustrating why certain broad head points cannot be overdrawn.

Shown in FIG. 2 is a typical prior-art handle 30PA. [It will be seen that the center] *Center* line 35PA is the same as that of the illustrative invention. [The handle] *Handle* section 31PA has [a] sight window face 34PA. As illustrated, [the] arrow 36 and its three vanes 38 could possibly interfere with [the] sight window face 34PA as the arrow passes through [the] center line 35PA. Similarly, when a broad head point is used on the arrow, it could possibly interfere with the prior-art sight window face 34PA and hence can only be drawn to the back of [the] handle [or riser] 30PA.

Figure 3:
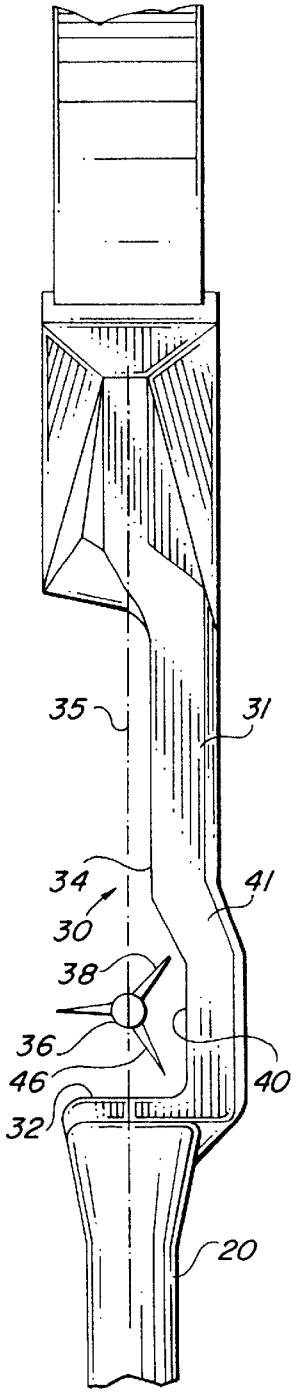
FIG. 3 is a view diagrammatically taken from the same vantage point as FIG. 2, but illustrating [the] *a* bow handle [riser] illustrative of the present invention and more particularly showing how the clearance is provided for the arrow vanes as well as a broad head point, irrespective of whether the broad head point is two, three, or four bladed.

Central to the present invention, as shown in FIG. 3, is the provision of a sight window overdraw offset 40 extending upwardly from [the overdraw offset] base 32[,] and terminating with [an overdraw offset] return 41 which rejoins [the] handle 11 [prior to the sight window] *at the lower end of* face 34 [joining the upper limb mount 21].

Figure 4:
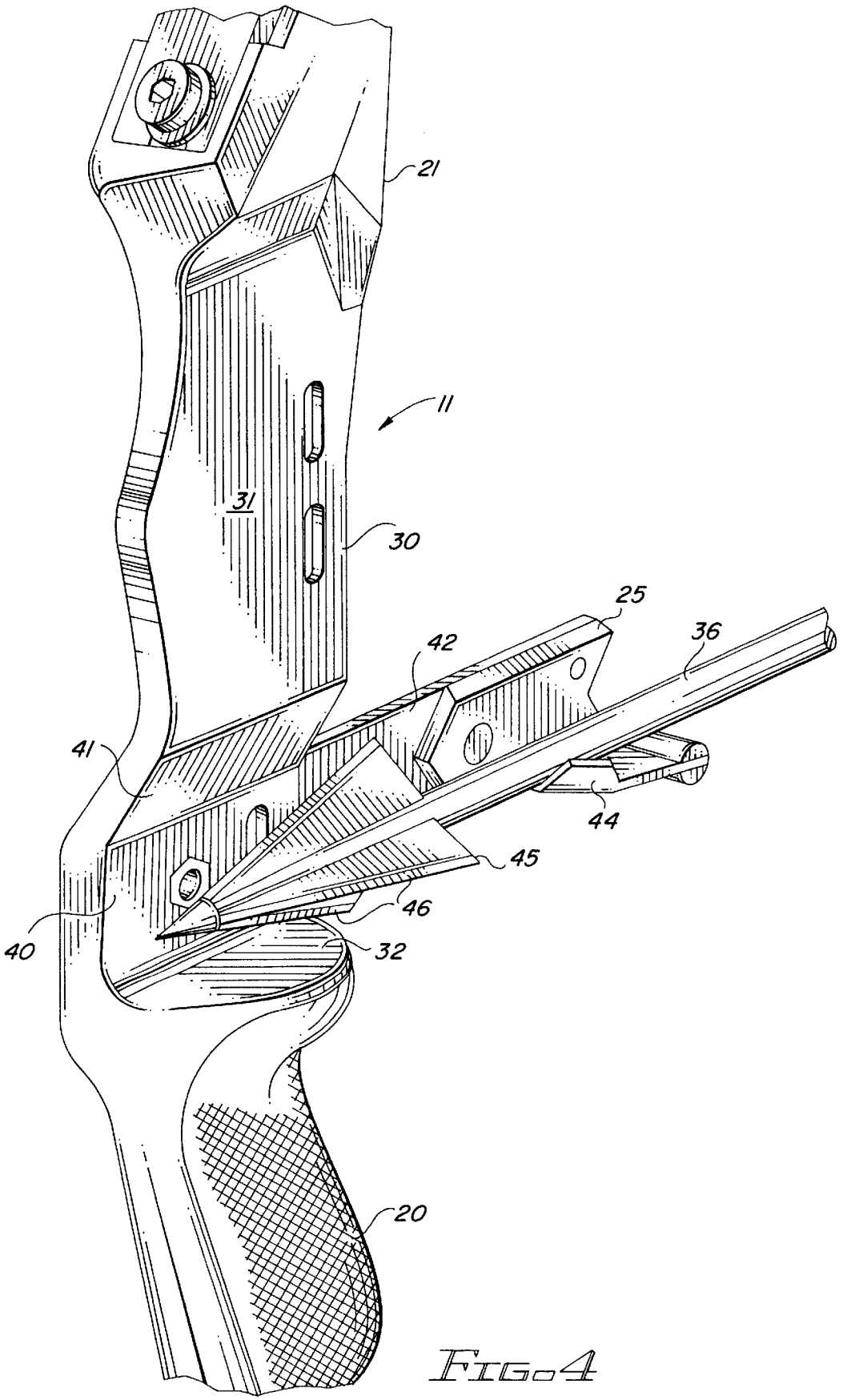
FIG. 4 is a partially broken perspective view showing the relationship between a broad head point of an arrow the arrow rest[,] and [the riser] *a handle of a bow constructed in accordance with* [illustrative of] the present invention.

Turning now to FIG. 4, [it will be seen that above the overdraw offset return 41, the] accessory mount area 31 is positioned *above return 41* to receive both [the] bow sight 24 and/or [the] bow quiver 26. These are joined to [the] accessory mount *area* 31 by [the bow] quiver bracket 28 and [the] sight bracket 29. [The arrow] *Arrow* rest 25, or 25' which is an alternative construction, [are] *is* secured by means of [an arrow rest] bracket 42 to the outside portion of [the sight window overdraw] offset 40. Conventional mounting means are employed. [The arrow] *Arrow* rest [assembly] 25 as shown in FIG. 1 is a conventional type[,] and mounts in [a] recess[, such as shown as] 51 [in FIG. 5] (*FIG. 5*), [to] *which can* receive various state of the art arrow rests. The alternative embodiment arrow rest 25' (FIG. 4) is secured by means of [its] mounting bracket 42' to the same location on the outside of [the] *a* sight window overdraw offset 40, as shown in FIG. 4. With alternative embodiment arrow rest 25', as shown in FIG. 4, an extension rod and fingers 44 extend outwardly to cradle [the] arrow 36 along its shaft[,] and extend sufficiently rearwardly so that [the] broad head 45 can pass [the sight] window 30, thereby permitting a shorter arrow to be used in a full drawn configuration[,] and avoiding contact by [the broad head] blades 46 with [the] *a* sight window overdraw offset 40. Thus when the shorter arrow is used, it can be [in effect,] overdrawn[,] without an overdraw modification to the bow. Thus [the] *a* shorter arrow can be used [with the] *for a* flatter trajectory in hunting configuration, with the twofold advantage of being able to be overdrawn without an overdraw accessory[,] and [with provision for] the vanes *being able* to pass the bow handle [or riser] without physical interference thereby avoiding deflection, friction, and unwanted instability in flight.

Figure 5:
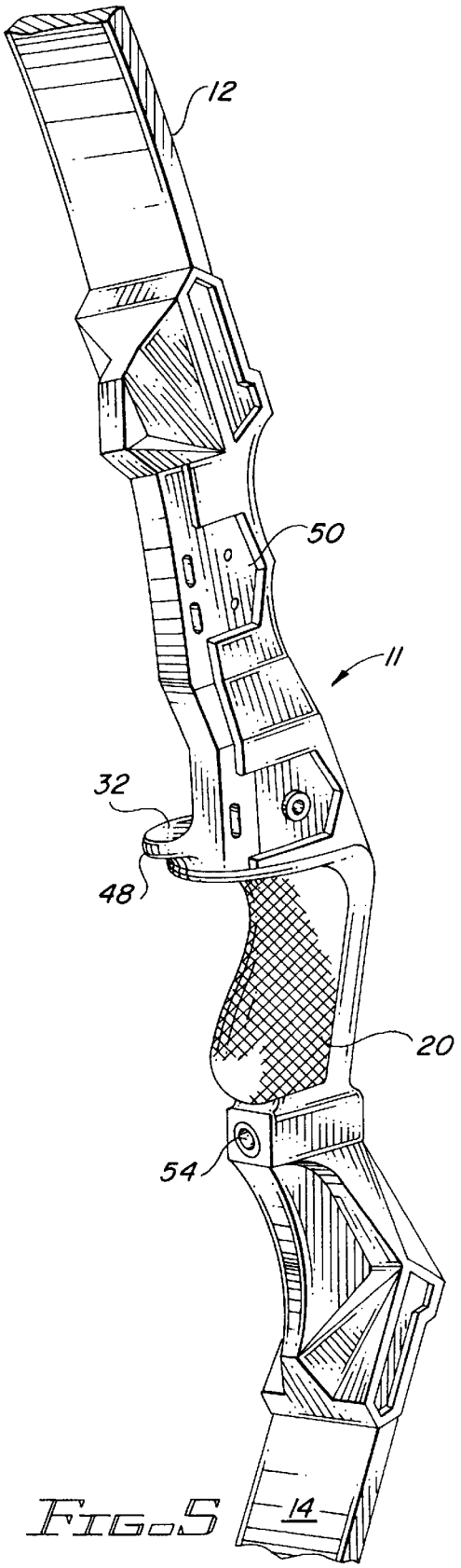
FIG. 5 is a [further] perspective, partially broken view of [the] *a* handle [riser] without accessories, [and] illustrating several of its details.
Figure 6:
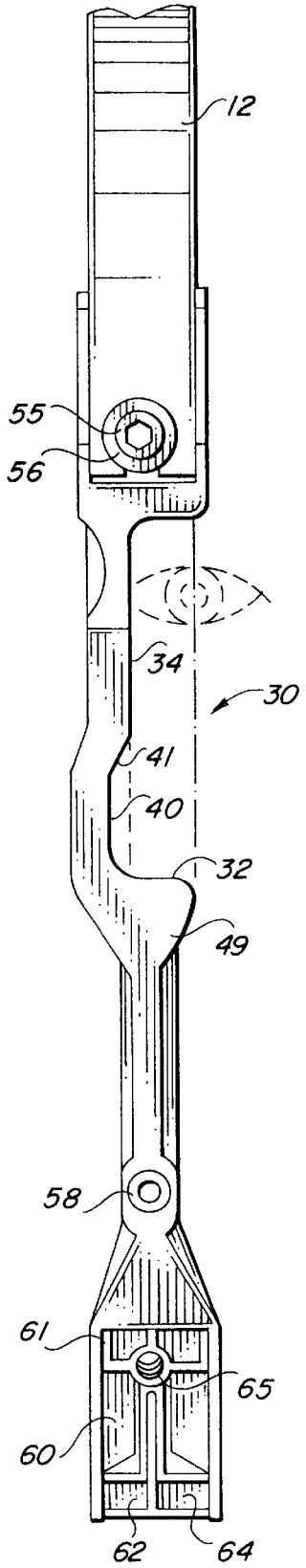
FIG. 6 is a front elevation of the perspective shown in FIG. 5 looking in the direction toward the shooter which would be a view from the right looking leftwardly at FIG. 5.

Further details of [the subject] handle 11 are shown in FIGS. 5 and 6. [There it will be seen that the face of the riser] *Front* 48 *of handle 11* is [opposed by a] *opposite* back [of the riser] 49. [A sight] *Sight*/quiver recess 50 is positioned [upwardly of the overdraw offset] *above* base 32. [The arrow rest overdraw recess] *Recess* 51, *for an overdraw arrow rest,* is [opposite the sight window overdraw] *on the outside of* offset 40. [A rest overdraw bushing] *Bushing* 52 is provided in [the same] *an overdraw arrow rest*. [A cable] *Cable* guard bushing 54 is provide beneath the grip 20. [The weight adjustment limb] *Limb* bolt 55 is positioned at the base of [the] upper limb 12[,] and is [put in in combination with a limb bolt] *inserted through* washer 56. [The stabilizer] *Stabilizer* bushing 58 is mounted opposite [the] cable guard bushing 54 as shown in the lower portion of FIG. 6.

[The limb] *Limb* socket [area] 60 is detailed at the lower portion of FIG. 6. It includes [a] butt alignment pad 61, [a limb half-round] alignment bar 62[,] and [a limb] half round seat 64, all of which receive the preformed end of [the] *a* limb, *secured* [for securement] by means of [the] limb bolt 55 such as shown in the upper portion of FIG. 6. [There is also provided a steel limb bolt threaded] *Threaded* insert 65, [as] shown in the lower portion of FIG. 6, *receives a limb bolt, not shown*.

As set forth above, the entire bow handle [or riser] 11 can be cast [of] *in* a single casting[,] and therefore the inherent expense remains essentially the same as the prior-art bow handle or riser. It can also mount the same accessories as the prior-art bow handle [or riser,] and provides for an arrow rest which will position the arrow along the center line of fire for release when the vane rear portion of the arrow passes the arrow rest.

Although particular embodiments of the invention have been shown and described in full here, there is no intention to thereby limit the invention to the details of such embodiments. On the contrary, the intention is to cover all modifications, alternatives, embodiments, usages, and equivalents of the subject invention as fall within the [spirit and] scope of [the invention, specification, and] the appended claims.

What is claimed is:

1. A bow handle for use with an overdraw arrow support having means for supporting an arrow with an arrowhead and vanes in an overdraw configuration, said handle having a hand grip, and upper limb mount, a lower limb mount and a pair of limbs, a bow string between the ends of said limbs, said bow string as drawn defining a bow string plane, said handle comprising, a sight window face displaced from the plane of the bow string, a sight window overdraw offset adjacent the hand grip [and offset from] *in* the sight window face and *displaced from* the plane of the bow string *and said sight window face* to provide clearance for the arrowhead and [the] vanes of said arrow, a [sight window overdraw offset] base [adjacent] *connecting said sight window overdraw offset to said handle at* said hand grip, said sight window face being between [sight window overdraw] offset and said upper limb mount, said sight window overdraw offset having a [sight window overdraw offset] return [remote from the base and terminating at the] *connecting said offset to said* sight window face.

2. [For use with] *In* an archery bow having a pair of limbs, a handle, [said handle having a hand grip, an upper limb mount and a lower limb mount,] a bow string between the ends of said limbs, said bow string as drawn defining a bow string plant, [for use with an overdrawn arrow with an arrowhead and vanes,] *said handle comprising:*

*a hand grip,*

*an upper limb mount for receiving one of said pair of limbs and a lower limb mount for receiving the other of said pair of said limbs,*

[said handle having] a sight window *having a* face displaced from the plane of the bow string, a sight window overdraw offset adjacent the hand grip and [offset] *displaced* from the sight window face [and] *away from* the plane of the bow string *and said sight window face* to provide clearance for [the] *an* arrowhead and [the] vanes of said arrow, a [sight window overdraw offset] base adjacent said hand grip, said sight window face being between said [sight window overdraw] offset and said upper limb mount, said sight window overdraw offset having a [sight window overdraw offset] return [remote from the base and terminating at the] *connecting said offset to said* sight window face, and means for securing an arrow rest between a mid-point in the sight window overdraw offset and a position rearwardly of said handle, whereby clearance for both the arrowhead and arrow vanes permit non-interference with the sight window overdraw offset.

3. [In the] *The* archery bow handle of claim 2, *wherein the portions of* said handle *that define said* sight window and *said* offset [portion above the hand grip having] *have a* substantially constant thickness.

4. An archery bow handle having a hand grip, [and] *an* upper *limb mount* and *a* lower limb mount; [portions for use with an archery bow and arrow in which said arrow has vanes and a broadhead point;

an accessory mount remote form the hand grip,]

a sight window overdraw offset adjacent said grip, a sight window face between the [sight window overdraw] offset and the upper limb mount, said [sight window overdraw offset having an] offset *displaced* from said sight window face to provide a clearance for [a] *the* broadhead [arrowhead] and [the] vanes of an arrow, means on said sight window overdraw offset [to mount]*for mounting* an arrow rest rearwardly of the sight window overdraw offset,

[said] *an* accessory mount positioned on the side of the handle opposite said sight window face and above said [sight window overdraw] offset [in predetermined spaced relationship to thereby accept] *for attaching a* bow sight or [quivers]*a quiver*.

5. [In the] *The* archery bow handle of claim 4, *wherein* said accessory mount [being] *is* proportioned to mount a sight.

6. [In the] *The* archery bow handle of claim 4, *and further comprising* means on said accessory mount [to mount] *for mounting* a bow quiver.

7. [In the] *The* archery bow handle of claim 4, *and further comprising* means on said accessory mount [to mount] *for mounting* both a sight and a bow quiver.

[8. In the archery bow handle of claim 4, means on said accessory mount to mount both a sight and/or bow quiver on the opposite side of the handle to the sight window face.]

9. [In the] *The* archery bow handle of claim 4, *wherein the portions of* said bow handle *that define said* sight window and *said* offset [portion above the hand grip having] *have* a substantially constant thickness.

10. An archery bow for use with an overdraw arrow having an arrow head and vanes, said bow comprising:

a handle with upper and lower limb mounts and a hand grip;

a pair of limbs each secured to a respective one of said limb mounts;

a bow string extending between an end of each of said limbs, said bow string defining a bow string plane as it is drawn;

said handle having a sight window face displaced from said bow string plane; and a sight window overdraw offset adjacent said hand grip and [offset] *displaced* from said sight window face and said bow string plane to provide clearance for the arrowhead and the vanes of said arrow, and means for securing an arrow rest between a position adjacent said sight window overdraw offset [to] *and* a position rearwardly of said handle.

11. In the archery bow of claim 10, an arrow rest, and means for securing an arrow rest between a mid-point in the sight window overdraw offset [to] *and* a position rearwardly of said handle, whereby clearance for both the arrowhead and arrow vanes permit non-inference with the [sight window overdraw] offset.

12. In the archery bow of claim 10, means to mount a sight adjacent the sight window face and secured opposite the sight window face.

13. In the archer bow of claim 10, means [on said sight mount portion to mount] *for mounting* a bow quiver at a position opposite the sight window face.

14. In the archery bow of claim 10, means [on said sight quiver mount portion to mount] *for mounting* both a sight and a bow quiver.

15. [For use with] *In* an archery bow having a pair of limbs, [a handle, said handle having a hand grip, an upper limb mount and a lower limb mount,] a bow string between the ends of said limbs, said bow string as drawn defining a bow string plane [for use with an overdrawn arrow with an arrowhead and vanes], *the handle comprising:*

*a hand grip,*

*an upper limb mount for receiving an end of one of said pair of limbs,*

*a lower limb mount for receiving an end of the other of said pair of limbs,*

[said handle having] a sight window face displaced from the plane of the bow string, a sight window overdraw offset adjacent the hand grip and [offset] *displaced* from the sight window face and the plane of the bow string to provide clearance for [the arrowhead and the vanes of said] *an* arrow, a [sight window overdraw offset] base [adjacent] *connecting said sight window overdraw offset to* said hand grip, said sight window face being between said sight window overdraw offset and said upper limb mount, said sight window overdraw offset having a [sight window overdraw offset] return remote from the base and terminating at the sight window face, and means for mounting [means for supporting said] *an* arrow *rest* sufficiently above said [overdraw offset] base and rearwardly of said handle to permit said arrow to be overdrawn.

16. [In the] *The* archery bow [handle] of claim 15, *wherein* said means for mounting [means for supporting said arrow] *is* sufficiently above said [overdraw offset of said] base to permit the vanes and arrowhead *of said arrow* to pass said handle without touching the same.

[17. In and of claims, 2, 4, 10, and 15, said handle in combination with a compound archery bow.]

18. A compound [archery] bow [having a handle,] *comprising* a pair of limbs, [said] *a* handle having a hand grip, an upper limb mount *connecting one of said pair of limbs to said handle* and a lower limb mount *connecting the other of said pair of limbs to said handle, a pair of pulleys connected one each to a free end of said limbs*, [a bow string between the ends of said limbs, said bow string as drawn defining a bow string plane for use with an overdrawn arrow with an arrowhead and vanes, said compound bow having pulleys at each end, and said] *a* bow string [being operable] connected [to] *between* said pulleys, *said bow string as drawn defining a bow string plane, wherein said handle includes*

[an accessory mount remote from the hand grip,]

a sight window overdraw offset adjacent said grip, a sight window face between the sight window overdraw offset and the upper limb mount, said [sight window overdraw] offset [having an offset] *being displaced* from said sight window face to provide a clearance for *an arrow having* a broadhead [arrowhead] and [the] vanes [of an arrow], a [sight window overdraw offset] base adjacent said hand grip,

[said] *an* accessory mount, positioned on the side of the handle opposite said sight window face and above said sight window overdraw offset in a predetermined [space] *spatial* relationship, [to thereby accept] *for attaching* bow sight or quivers *to said handle,* means for mounting [means for supporting said] *an* arrow *rest* sufficiently above said [overdraw offset] base to permit said arrow to be overdrawn, said means for mounting [means for supporting said arrow] located sufficiently above said [overdraw offset] base and rearwardly of said handle to permit the *broadhead and* vanes [and arrowhead] *of said arrow* to pass said handle without touching the same.

* * * * *